(12) United States Patent
Tagawa et al.

(10) Patent No.: US 7,172,718 B2
(45) Date of Patent: Feb. 6, 2007

(54) METHOD OF MANUFACTURING A RUBBER SHEET FOR A POWER TRANSMISSION BELT AND A POWER TRANSMISSION BELT INCORPORATING THE RUBBER SHEET

(75) Inventors: Takayuki Tagawa, Hyogo (JP); Tomohiro Miwa, Hyogo (JP); Toshihiro Nishimura, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 388 days.

(21) Appl. No.: 10/747,636

(22) Filed: Dec. 29, 2003

(65) Prior Publication Data

US 2004/0217519 A1    Nov. 4, 2004

(30) Foreign Application Priority Data

Dec. 26, 2002 (JP) ............................. 2002-377687
Aug. 25, 2003 (JP) ............................. 2003-299667
Nov. 18, 2003 (JP) ............................. 2003-387813

(51) Int. Cl.
B29C 47/06 (2006.01)
B29D 29/08 (2006.01)

(52) U.S. Cl. ............... 264/146; 264/162; 264/171.26; 264/173.16; 264/177.2; 156/137

(58) Field of Classification Search .................... None
See application file for complete search history.

(56) References Cited

U.S. PATENT DOCUMENTS

| | | | | |
|---|---|---|---|---|
| 4,395,298 A | * | 7/1983 | Wetzel et al. ............... | 156/137 |
| 4,859,390 A | * | 8/1989 | Fritsch et al. ............... | 264/143 |
| 5,429,487 A | * | 7/1995 | Tajima et al. ............... | 425/72.1 |
| 5,679,303 A | * | 10/1997 | Hayashi et al. ............. | 264/167 |
| 6,177,202 B1 | * | 1/2001 | Takehara et al. ............ | 428/515 |
| 2004/0028899 A1 | * | 2/2004 | Peronnet-Paquin et al. . | 428/373 |
| 2004/0046275 A1 | * | 3/2004 | Tagawa et al. ............. | 264/145 |
| 2004/0058767 A1 | * | 3/2004 | Hara et al. .................. | 474/263 |
| 2005/0220919 A1 | * | 10/2005 | Fischer et al. .............. | 425/208 |

FOREIGN PATENT DOCUMENTS

| | | | |
|---|---|---|---|
| GB | 2154499 A | * | 2/1984 |
| JP | 01-304924 | | 8/1989 |
| JP | 08-074936 | | 3/1996 |
| JP | 2002-113764 | * | 4/2002 |
| JP | 2003-1720 | * | 1/2003 |
| JP | 2004-136649 A | * | 5/2004 |

* cited by examiner

*Primary Examiner*—Mark Eashoo
(74) *Attorney, Agent, or Firm*—Wood, Phillips, Katz, Clark & Mortimer

(57) ABSTRACT

A method of manufacturing a power transmission belt having a body with a length and a cushion rubber layer in which at least one carrying member is embedded so as to extend lengthwise of the body. The method includes the steps of: extrusion molding (a) a first rubber composition including rubber with short fibers therein and (b) a second rubber composition that is different than the first rubber composition to produce a first sheet in which the second rubber composition defines at least a part of the cushion rubber layer; applying the at least one load carrying member to the second rubber composition to produce a preform assembly; and processing the preform assembly to produce a power transmission belt.

39 Claims, 7 Drawing Sheets

METHOD OF MANUFACTURING A RUBBER SHEET FOR A POWER TRANSMISSION BELT AND A POWER TRANSMISSION BELT INCORPORATING THE RUBBER SHEET

BACKGROUND OF THE INVENTION

1. Field of the Invention

The invention relates to power transmission belts and, more particularly, to a method of manufacturing a rubber sheet for incorporation into a power transmission belt and made up of at least two different rubber compositions which are combined using an extrusion process.

2. Background Art

Short fibers are commonly embedded in rubber to define component portions of power transmission belts. The fibers are typically oriented so that their lengths are substantially parallel. To establish the orientation of the fibers, it is known to mix fibers in a non-cured rubber. The rubber and fiber mix is then placed between a pair of calendar rolls which are operated at different rotational speeds as is typical of a rolled sheet fabrication process. The length of the fibers align with the rolling direction for the resulting sheet, which can then be cut to dimensions to fit around a molding drum. A plurality of these sheets are then overlapped and laminated to produce a composite sheet with a thickness dictated by a final desired belt configuration. The composite sheet is then wrapped around a molding drum, with the length of the fibers oriented widthwise/axially of the drum, preparatory to forming a power transmission belt in conventional manner.

More specifically, a V-ribbed belt or raw-edged V-belt may be conventionally formed by initially wrapping one, or a plurality of, sheets of cover fabric/canvas around a cylindrically-shaped molding drum. A cushion rubber layer is in turn wrapped around the cover canvas sheet(s) after which at least one load carrying member is spirally wrapped against the cushion rubber layer. The load carrying member is made commonly in the form of an elongate cord. The compression rubber layer is then wrapped in place to complete a sleeve preform. In the preform, the compression rubber layer may have a thickness that is made up of three to four rolled sheets formed by the above-described method, with the lengths of the short fibers oriented in the widthwise direction. The resulting preform is then cured, after which the preform is processed to produce individual power transmission belts.

To establish a consistent, parallel, orientation of the fibers, the thickness of the sheets must be maintained below a predetermined dimension, which is normally significantly less than the end thickness of the compression rubber layer, or other layer into which the fibers are incorporated. The combining of the individual sheets to produce the desired end thickness inevitably adds time and labor costs to the manufacturing process, that would otherwise not be encountered if the desired end thickness for the sheet could be achieved in a single step.

One proposed solution to this problem has been to employ a cylindrically-shaped mold/die through which a rubber composition, incorporating the fibers, can be extruded, as shown in JP-B-9847. More particularly, the mold has an expansion portion which is used to orient the lengths of the fibers to extend in a circumferential direction relative to cylindrical inner and outer peripheral mold surfaces which bound a flow passage through which the rubber composition is extruded. The mold has a middle space between an inlet space and an outlet space. The volume of the middle space is larger than that of the inlet space. The cross-sectional area of the outlet space is made larger by a predetermined amount than the cross-sectional area of the inlet space. The width of the inlet portion of the flow passage is smaller than that of the middle portion, with the width of the outlet portion being not greater than the width of the middle portion.

As shown in JP-A-8-74936, it is also known to form a sheet from a rubber composition including short fibers using an expansion mold/die and an extruder which is located at an outlet portion thereof. The outlet portion has V-shaped molding grooves. A cylindrically-shaped, ribbed rubber product is formed, which can be strategically cut to allow reconfiguration thereof into a sheet form. The resulting sheet is formed into a continuous sleeve shape around a molding drum, cured, and ultimately ground to produce ribs, as on a V-ribbed belt.

Commonly, a particularly sticky material, such as chloroprene rubber, is used to make sheets using the conventional expansion die technology. The sticky rubber composition may not flow smoothly against the mold surfaces due to a high coefficient of friction between the rubber composition and the mold surfaces. This condition may cause a roughening of the rubber surfaces and separation of the fiber from the matrix rubber and/or a random, nonuniform distribution of fibers therein. The resulting sheet may be of a sufficiently poor quality that it may not be practically used, for example, in a compression rubber layer of a power transmission belt.

SUMMARY OF THE INVENTION

In one form, the invention is directed to a method of manufacturing a power transmission belt having a body with a length and a cushion rubber layer in which at least one load carrying member is embedded so as to extend lengthwise of the body. The method includes the steps of: extrusion molding (a) a first rubber composition including rubber with short fibers therein and (b) a second rubber composition that is different than the first rubber composition to produce a first sheet in which the second rubber composition defines at least a part of the cushion rubber layer; applying the at least one load carrying member to the second rubber composition to produce a preform assembly; and processing the preform assembly to produce a power transmission belt.

In one form, the step of extrusion molding a first rubber composition and a second rubber composition involves extrusion molding a second rubber composition that has no short fibers therein.

In one form, the step of extrusion molding a first rubber composition and a second rubber composition involves extrusion molding a first rubber composition and a second rubber composition in a cylindrically-shaped mold with an inside peripheral surface and an outside peripheral surface between which a flow passage having a diameter is defined with an expansion portion with an inlet and a discharge port in which the flow passage increases in diameter from the inlet towards the discharge port and so that the first rubber composition is at the inside peripheral surface and the second rubber composition is at the outside peripheral surface.

In one form, the step of applying at least one load carrying member involves wrapping the at least one load carrying member and the first sheet around a molding drum and against each other.

In one form, the step of processing the preform assembly involves grinding the body to define ribs extending lengthwise of the body.

The step of processing the preform assembly may involve applying at least one additional layer to the preform assembly.

The step of applying at least one addition layer may involve applying a fabric layer to the preform assembly. Alternatively, a rubber layer may be applied to the preform assembly.

The method may further including the steps of manufacturing a second sheet in substantially the same manner as the first sheet is manufactured and joining the first and second sheets to each other to produce a composite preform assembly.

In one form, the step of processing the preform assembly involves processing the composite preform assembly by forming ribs in the body.

The step of forming ribs in the body may involve forming ribs in each of the first and second sheets.

The step of grinding the body may involve grinding the first rubber composition.

In one form, the step of applying the at least one load carrying member involves applying at least one load carrying member directly to the second rubber composition.

In one form, the step of extrusion molding a first rubber composition and a second rubber composition involves extruding the first rubber composition into a cylindrical shape with a peripheral inner surface and a peripheral outer surface and thereafter extruding a second rubber composition to cover the peripheral outer surface of the cylindrical shape defined by the first rubber composition to produce a composite cylindrical shape.

In one form, the step of extrusion molding a first rubber composition and a second rubber composition involves causing the composite cylindrical shape to be extruded through a flow passage in a cylindrically-shaped mold in an expansion portion of the flow passage having an inlet and discharge port downstream of the inlet and wherein the flow passage is defined between an inside peripheral surface and an outside peripheral surface on the cylindrically-shaped mold and configured so that the diameter of the flow passage increases from the inlet towards the discharge port.

In one form, the step of extrusion molding a first rubber composition and a second rubber composition involves simultaneously and continuously extruding a first and second rubber composition through the flow passage.

The step of extrusion molding a first rubber composition and a second rubber composition may involve introducing the first rubber composition into the flow passage at a first location and introducing the second rubber composition into the flow passage downstream from the first location at a second location.

In one form, the flow passage has a radial thickness and the step of extrusion molding a first rubber composition and a second rubber composition involves causing the first rubber composition to have a controlled first thickness between the first location and the second location and causing the thickness of the combined first composition and the second composition in the flow passage to have a controlled second thickness that is greater than the first thickness between the second location and the discharge port.

The step of introducing the first rubber composition may involve introducing the first rubber composition at the first location at the inlet to the expansion portion of the flow passage.

The step of introducing the second rubber composition may involve introducing the second rubber composition at the second location downstream of the inlet for the expansion portion of the flow passage.

The second location may be adjacent the discharge port.

The method may further include the step of kneading the first rubber composition before the first composition is introduced to the inlet of the expansion portion of the flow passage.

The step of kneading the first rubber composition may involve kneading the first rubber composition using an extrusion screw.

The method may further include the step of passing the first rubber composition through a gear pump.

In one form, the step of passing the first rubber composition through a gear pump involves passing the first rubber composition through a gear pump between the extrusion screw and the inlet of the expansion portion of the flow passage.

The step of processing the preform assembly may involve processing the preform assembly to produce one of a V-belt, a V-ribbed belt, and a double V-ribbed belt.

The invention is further directed to a method of manufacturing a rubber sheet to define at least a part of a compression rubber layer and cushion rubber layer in a power transmission belt. The method includes the step of extrusion molding (a) a first rubber composition that includes rubber with short fibers therein and (b) a second rubber composition that is different than the first rubber composition. The step of extrusion molding may involve (c) extrusion molding the first and second rubber compositions in a cylindrically-shaped mold with an inside peripheral surface and an outside peripheral surface between which a flow passage having a diameter is defined with an expansion portion with an inlet and a discharge port and in which the flow passage increases in diameter from the inlet towards the outlet so that the first and second rubber compositions are combined and the first rubber composition is at the inside peripheral surface and the second rubber composition is at the outside peripheral surface, and (d) cutting the combined extruded first and second rubber compositions discharged at the discharge port to configure the first and second combined rubber compositions discharged at the discharge port into a sheet form.

In one form, the step of extrusion molding a first rubber composition and a second rubber composition involves extrusion molding a second rubber composition that has no short fibers therein.

In one form, the step of extrusion molding a first rubber composition involves extruding the first rubber composition to a cylindrical shape with a peripheral inner surface and a peripheral outer surface and thereafter extruding the second rubber composition to cover the peripheral outer surface of the cylindrical shape defined by the first rubber composition to produce a composite cylindrical shape.

In one form, the step of extrusion molding a first rubber composition and a second rubber composition involves simultaneously and continuously extruding the first and second rubber compositions through the flow passage.

In one form, the step of extrusion molding a first rubber composition and a second rubber composition involves introducing the first rubber composition into the flow passage at a first location and introducing the second rubber composition into the flow passage downstream from the first location at a second location.

In one form, the flow passage has a radial thickness and the step of extrusion molding a first rubber composition and a second rubber composition involves causing the first rubber composition to have a controlled thickness between the first location and the second location and causing the thickness of the combined first composition and second composition in the flow passage to have a controlled second thickness that is greater than the first thickness between the second location and the discharge port.

The step of introducing the first rubber composition may involve introducing the first rubber composition at the first location at the inlet to the expansion portion of the flow passage.

The step of introducing the second rubber composition may involve introducing the second rubber composition at the second location downstream of the inlet to the expansion portion of the flow passage.

The second location may be adjacent to the discharge port.

The method may further include the step of kneading the first rubber composition before the first rubber composition is introduced to the inlet of the expansion portion of the flow passage.

The step of kneading the first rubber composition may involve kneading the first rubber composition using an extrusion screw.

The method may further include the step of passing the first rubber composition through a gear pump.

In one form, the step of passing the first rubber composition through a gear pump involves passing the first rubber composition through a gear pump between the extrusion screw and the inlet to the expansion portion of the flow passage.

DETAILED DESCRIPTION OF THE DRAWINGS

Figure 1:
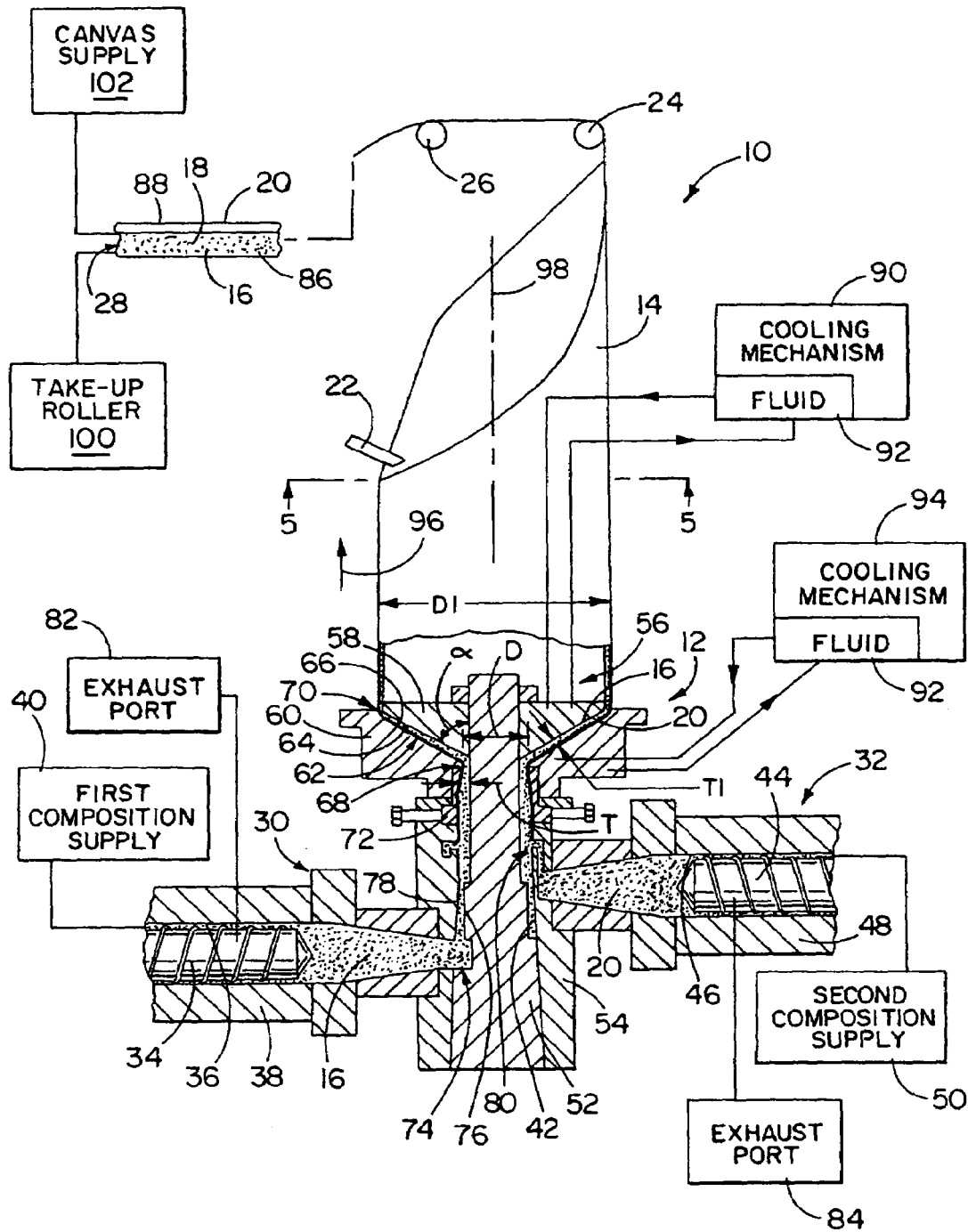
FIG. 1 is a partially schematic, cross-sectional view of a system for manufacturing a composite sheet for incorporation into a power transmission belt, according to the invention, and including a cylindrically-shaped mold/die through which first and second compositions are extruded to a cylindrical shape which is cut into a sheet form, and including two mechanisms for introducing the two compositions into a flow passage therein.
Figure 6:
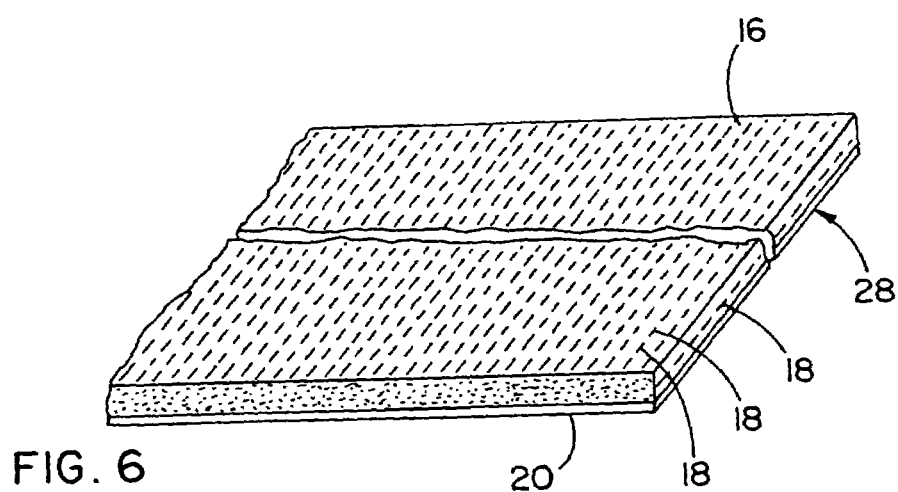
FIG. 6 is a fragmentary, perspective view of a rubber sheet that is formed from the extruded, cylindrical shape shown in FIG. 5.

In FIG. 1, a partially schematic representation of a sheet forming system, according to the present invention, is shown at 10. The system 10 includes a cylindrically-shaped mold/die at 12 through which a cylindrically-shaped mold product 14 is produced. The mold product 14 consists of a first rubber composition 16 having short fibers 18 therein, that is laminated to a second rubber composition 20, that is different than the first rubber composition 16. In this embodiment, the second rubber composition 20 has no fibers embedded therein. However, the invention contemplates that fibers may be provided in the second rubber composition 20 with a different composition or density than the short fibers 18 in the first rubber composition 16. Through a cutter 22, the cylindrically-shaped mold product 14 is severed and drawn over guide rollers 24,26 to a location at which it is cut into sheets 28 having selected length and width dimensions, as seen also in FIG. 6.

The cylindrically-shaped mold/die 12 includes a first extruding mechanism 30, for the first rubber composition 16, and a second extruding mechanism 32, for the second rubber composition 20. The first extruding mechanism 30 has an extrusion screw 34 which is rotated within a space 36 defined by a cylinder 38 to continuously knead the first rubber composition 16 fed from a supply 40 thereof and advance the same continuously to a flow passage 42 defined by the cylindrically-shaped mold/die 12. The second extruding mechanism 32 includes a like extrusion screw 44 that is rotated within a space 46 defined by a cylinder 48 to knead the second rubber composition 20 that is fed from a supply 50.

The kneaded composition 20 is continuously fed to the flow passage 42 at a diametrically opposite location to the point of introduction of the first rubber composition 16 through the first extruding mechanism 30. The first and second rubber compositions 16,20 are introduced to the flow passage 42 at an upstream mold portion defined by a stepped, cylindrical shaft 52 which is surrounded by a sleeve 54. The introduced first and second rubber compositions 16,20 flow downstream, upwardly in FIG. 1, into an expansion portion of the cylindrically-shaped mold/die 12 at 56. The expansion portion 56 includes an inner die element 58, carried on the shaft 52, and an outer die element 60, supported upon the sleeve 54 in operative relationship with the inner die element 58.

The die elements 58,60 cooperatively define an expansion portion of the flow passage 42 at 62. The inner die element 58 has a conically-shaped, peripheral, radially outwardly facing surface 64. The outer die element 60 has complementary, conically-shaped, peripheral, radially inwardly facing surface 66. The expansion portion 62 of the flow passage 42, defined between the surfaces 54,66, progressively increases in diameter between an inlet 68 and a discharge port 70. A block body 72 is mounted in the vicinity of the inlet 68 and is adjustable to control the thickness T of the compositions that are introduced to the expansion portion 62 at the inlet 68 thereof.

The second extruding mechanism 32 is situated closer to the inlet 68 than is the first extruding mechanism 30. At the location at 74, at which the first rubber composition 16 is introduced to the flow passage 42, the first rubber composition 16 is formed into a cylindrical shape around the shaft 52, with a peripheral inner surface 76 and a peripheral outer surface 78. The second rubber composition 20 is introduced to the flow passage 42 at a location at 80, downstream of the location 74, so that the second rubber composition 20 is caused to surround the peripheral outer surface 78 of the first rubber composition 16. The second rubber composition 20, which may be devoid of fibers and has good flowability, can flow freely and smoothly around the peripheral outer surface 78 so as to completely surround and coat the peripheral outer surface 78 of the first rubber composition 16 to a uniform thickness.

During the kneading process in the extruding mechanisms 30,32, gas, and the like, generated from the air and the rubber compounds within the cylinders 38 and 48, is exhausted via ports 82,84, respectively. The temperatures of the cylinders 38,48 are maintained within a predetermined range, depending upon the type of ruber that is utilized. Typically, the temperatures will be in the range of 40–100° C. to maintain the rubber composition in a state wherein it can be easily mixed and extrusion molded. The time period over at which kneading is carried out is controlled so that the rubber does not cure during the kneading process.

The thickness T1 of the expansion portion 62 of the flow passage 42 is substantially uniform between the inlet 68 and discharge port 70. The diameter of the expansion portion 62 of the flow passage 42 increases progressively between the inlet 68 and discharge port 70. As the combined rubber compositions 16,20 flow through the expansion portion 62, the compositions 16, 20 are stretched in a circumferential direction to cause the lengths of the short fibers 18 to likewise circumferentially orient. As the combined compositions 16,20 are stretched through the expansion portion 56 of the flow passage 42, substantially uniform orientation of the fibers 18 is established at the point that the compositions reach the discharge port 70. At the discharge port 70, the combined compositions 16,20 are discharged in a cylindrical shape, with the resulting cylindrically-shaped mold product 14 having a first layer 86, consisting of the first rubber composition 16, and a surrounding second layer 88, consisting of the second rubber composition 20. In an exemplary sheet composition, the first layer 86 has a thickness of 1.5 to 10 mm. The second layer 88 has a thickness of from 0.1 to 1.0 mm.

In this embodiment, the expansion portion 56 of the mold/die 12 is configured so that the flow therethrough is substantially orthogonal to the flow direction for the first and second rubber compositions 16,20 through the extruding mechanisms 30,32, respectively. By orienting the flow passage through the expansion portion 56 of the mold/die 12 so that the combined compositions 16, 20 move vertically upwardly, the combined first and second compositions 16,20 departing from the discharge port 70 are moved against gravitational forces so that there are not any significant, detrimental horizontal deformation forces developed on the mold product 14 as might otherwise be developed in the event a nonvertical orientation is employed. As a result, a consistent shape and dimension for the resulting cylindrically-shaped mold product 14 results. This arrangement is also desirable in that the potentially heavy inner die element 58 imparts a straight vertical load under its weight, thereby reducing any tendency of the inner die element 58 to horizontally deflect any part of the cylindrically-shaped mold/die 12. As a result, a consistent clearance dimension (T1) can be maintained between the inner die element 58 and outer die element 60.

By maintaining a uniform thickness T1 for the expansion portion 62 of the flow passage 42, the combined compositions 16,20 may flow smoothly at a constant rate, thereby avoiding thickness variations and residual, internal strains within the discharging cylindrically-shaped mold product 14. A uniform thickness for the cylindrically-shaped mold product 14 may result, with a homogeneous composition that accounts for predictable and uniform properties.

The shape of the die surface 64 has a significant influence on the magnitude of the shearing forces that are generated on the rubber composition 16. The taper angle a for the surface 64 is preferably in the range of 30° to less than 90°. The inlet 68 has a diameter D in the range of 20 to 60 mm. The discharge port 70 has a diameter D1 from 100 to 440 mm. The desired expansion ratio (discharge port 70/inlet 68) is preferably in the range of 1.5 to 12.5. Below this range, extension of the composition 16 may not be sufficient to cause the short fibers 18 to consistently circumferentially orient on the inner and outer regions of a cylindrically-shaped mold product 14 with a relatively large thickness. If this range is exceeded, the circumferential extension may become excessive, whereby the cylindrically-shaped mold product 14 may be prone to tearing, particularly in the event that the extrusion pressures are not adequately high.

To control internal heat generation in the expansion portion 62 of the flow passage 42, between the inner die element 58 and outer die element 60, a cooling mechanism 90 can be included to circulate a cooling fluid 92 in a circulating path. A similar cooling mechanism 94 may be associated with the outer die element 60 to continuously circulate a like fluid 92. A pump (not shown) may be utilized, as within the die elements 58,60, to facilitate the circulation of the fluid 92.

Figure 5:
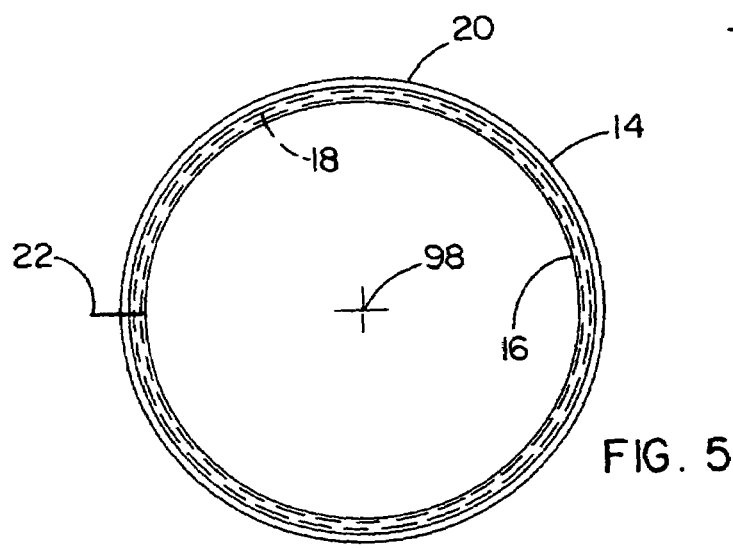
FIG. 5 is a cross-sectional view of a discharged extrusion from the cylindrically-shaped mold/die, including the two different compositions, and taken along 5—5 of FIG. 1.

As seen also in FIG. 5, the cutter 22 is designed to sever the cylindrically-shaped mold product 14 in a lengthwise direction, as indicated by the arrow 96 in FIG. 1, parallel to the central axis 98 for the cylindrically-shaped mold/die 12 and mold product 14. This direction is parallel to the discharging direction for the cylindrically-shaped mold product 14. The cutter 22 may be a bladed structure, such as a cutter or knife. Alternatively, the cutter 22 could utilize a laser. Further, an ultrasonic vibration cutting mechanism may be utilized.

The two-layered sheet 28 can then be accumulated upon a take-up roller 100. A canvas sheet, from a supply 102 thereof, may be continuously laminated upon the sheet 28 as it is accumulated on the take-up roller 100.

Figure 2:
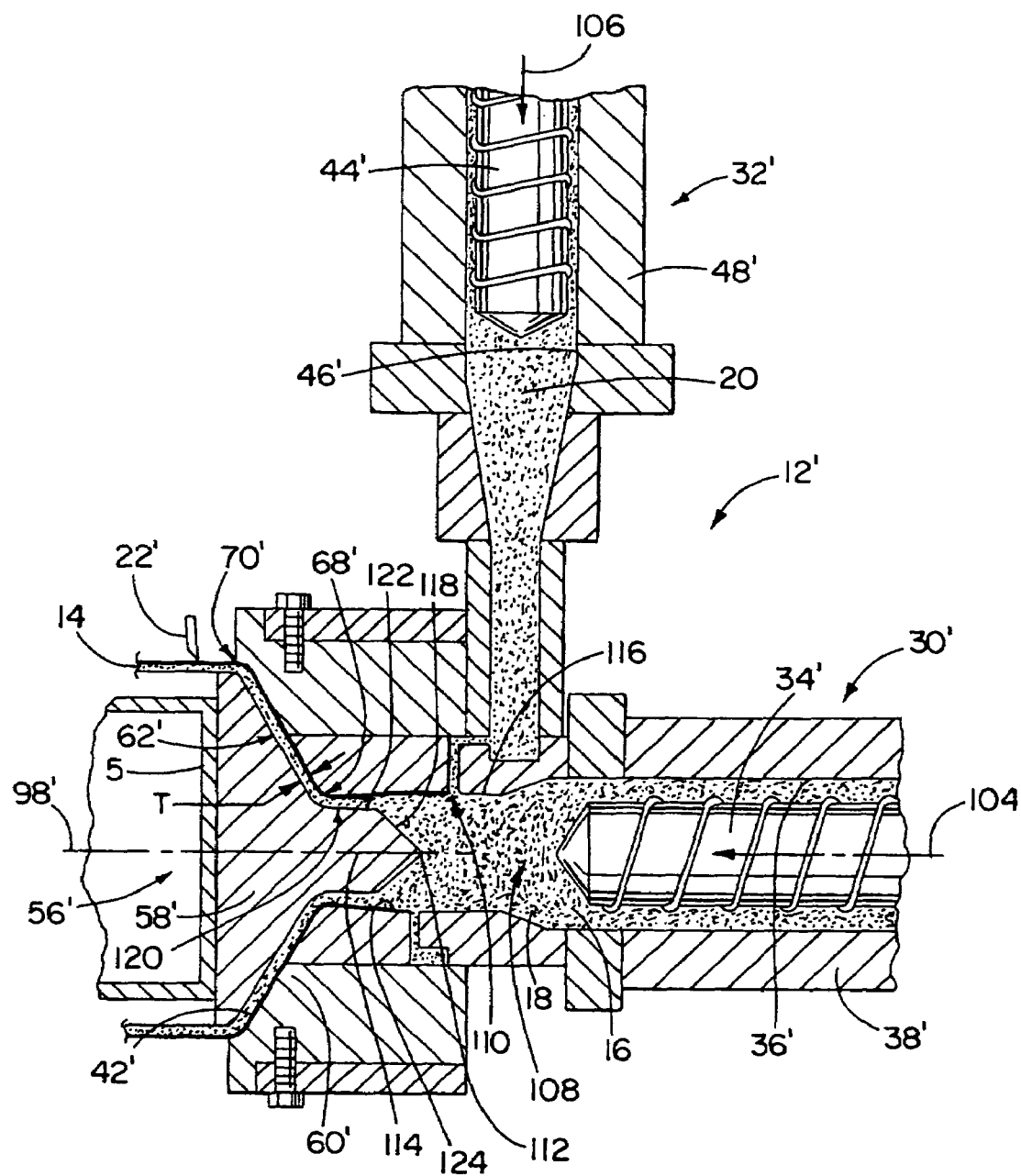
FIG. 2 is an enlarged, fragmentary, cross-sectional view of a modified form of cylindrically-shaped mold/die, according to the invention, and including a different configuration of the mechanisms for introducing the compositions into the flow-passage.

A modified form of cylindrically-shaped mold/die, according to the present invention, is shown at 12' in FIG. 2. The cylindrically-shaped mold/die 12' is operable in generally the same manner as the mold/die 12 to extrusion mold the aforementioned sheet 28. The mold/die 12' has components corresponding to those in the mold/die 12. Like elements will be identified with the same number as used with respect to FIGS. 1 and 5, with a "'" designation.

The cylindrically-shaped mold/die 12' has a first extruding mechanism 30' for kneading the first rubber composition 16 with the short fibers 18 therein. This is accomplished by rotating an extrusion screw 34' within a space 36' defined by a cylinder 38'.

A second extruding mechanism 32' kneads the rubber composition 20 through an extrusion screw 44' which rotates within a space 46' defined by a cylinder 48'. The compositions 16,20 are introduced to a flow passage 42'. An expansion portion 56' of the cylindrical-shaped mold/die 12' includes an inner die element 58' and an outer die element 60', which cooperatively produce an expansion portion 62' of the flow passage 42' that increases in diameter between an inlet 68' and a discharge port 70' thereon.

The extrusion screw 34' advances the kneaded first rubber composition 16 in the direction of the arrow 104, which is substantially parallel to the central axis 98' for the expansion portion 62' of the flow passage 42'. The extrusion screw 44' advances the second rubber composition 20 in a line, indicated by the arrow 106, that is substantially orthogonal to the axis 98'. The first rubber composition 16 is caused to be formed into a solid cylindrical block at 108 at the point that the rubber composition 16 departs from the extrusion screw 34'. This block 108 is then surrounded by the second rubber composition 20 introduced radially at a location 110 in the vicinity of a free end 112 of a projection 114 on the inner die element 58'. The second rubber composition 20 is caused to surround/coat the outer peripheral surface 116 of the block 108 of the first rubber composition 16 to a uniform thickness. The block 108 is radially reinforced by the projection 114 as the second rubber composition 20 is applied thereagainst.

The projection 114 has a conical surface 118 which causes the first rubber composition 16 to progressively radially diverge into a flow passage portion at 120. The flow passage portion at 120 is defined between a radially outwardly facing surface 122 on the projection 114, having a substantially uniform diameter, and a radially inwardly facing surface 124, which decreased in diameter progressively, from right to left in FIG. 2, towards the inlet 68' up to the desired thickness T.

As the combined compositions 16,20 are extruded between the inlet 68' and the discharge port 70', the lengths of the short fibers 18 are caused to orient in the circumferential direction in the same manner as described with respect to FIG. 1.

As with the cylindrically-shaped mold/die 12, the fibers 18 in the mold/die 12' are extended in a circumferential direction so that the lengths of the fibers 18 are circumferentially oriented as the combined compositions 16,20 are formed into the cylindrically-shaped mold product 14, having the same configuration as shown in FIG. 5. The cylindrically-shaped molded product 14 is then cut with a cutter 22' to allow it to be formed into the sheet 28, as previously described.

With this mold/die construction, the first and second compositions 16,20 are simultaneously extruded from the inlet 68' to the discharge port 70' with the second rubber composition 20 surrounding the first rubber composition 16 as it travels through the flow passage 42 from the location at 110 to the discharge port 70.

Figure 3:
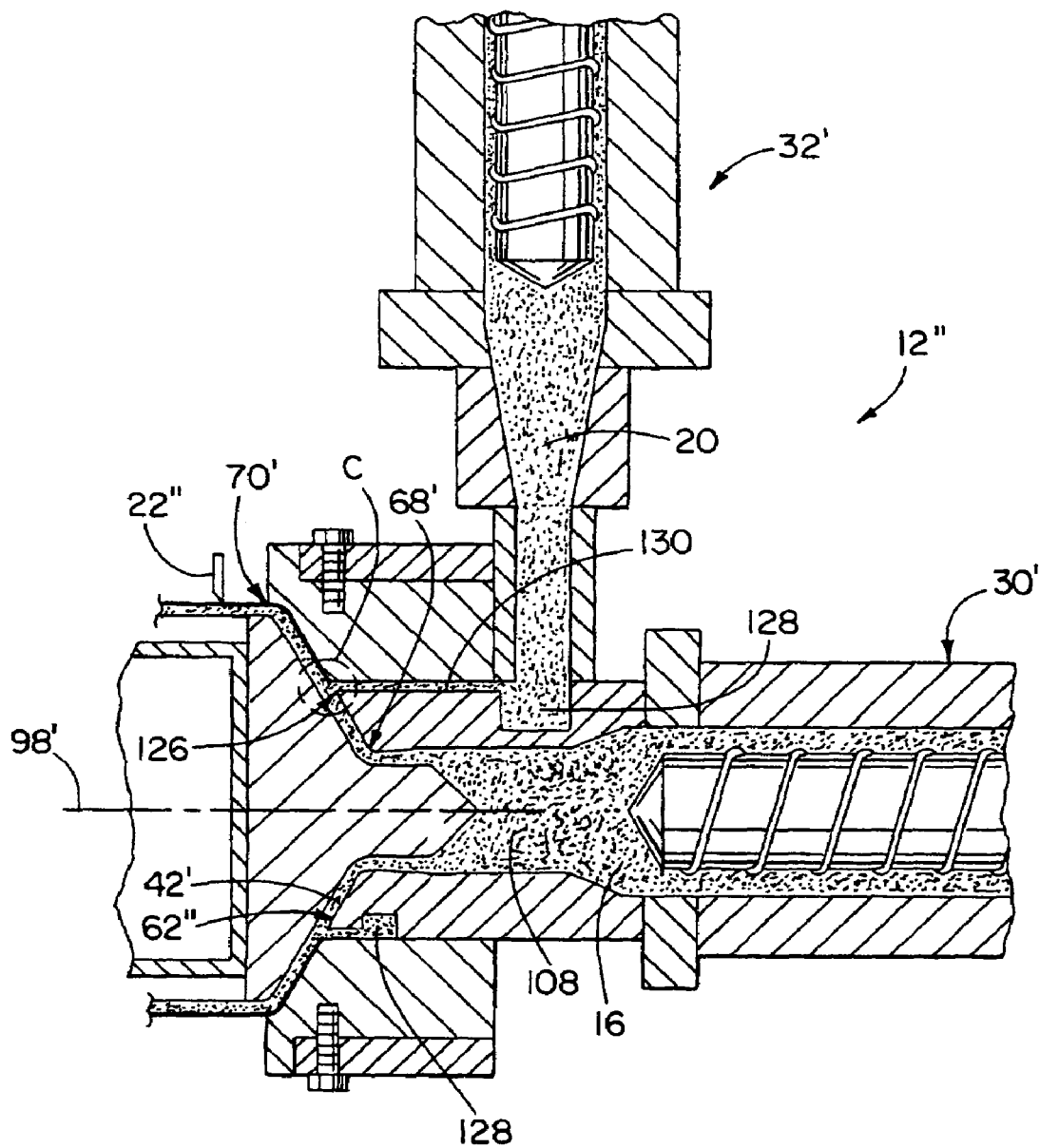
FIG. 3 is a view as in FIG. 2 of a further modified form of mechanism for introducing the compositions and wherein one of the compositions is introduced into the flow passage at a different location than in the embodiment of FIG. 2.
Figure 4:
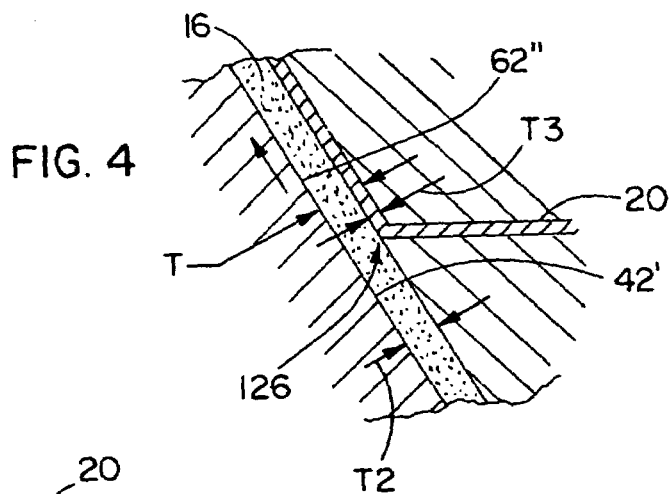
FIG. 4 is an enlarged, fragmentary, cross-sectional view of the location at which one of the compositions is introduced to the flow passage, and within the circle C in FIG. 3.

In FIGS. 3 and 4 a further modified form of cylindrically-shaped mold/die, according to the present invention, is shown at 12". The cylindrically-shaped mold/die 12" has, with one exception, the same construction as the cylindrically-shaped mold/die 12'. Those elements in the mold/die 12", that are identical to the corresponding elements on the mold/die 12', will be identified with the same reference numerals used with respect to the cylindrically-shaped mold/die 12' in FIG. 2. The difference resides in the location at 126 at which the second rubber composition 20 is introduced to the expansion portion 62" of the flow passage 42'.

As in the cylindrically-shaped mold/die 12', the first rubber composition 16 is introduced at the inlet 68' of the expansion portion 62". The location at 126 at which the second rubber composition 20 is introduced to the expansion portion 62" resides between the inlet 68' and the discharge port 70'. In this embodiment, the location as 126 is approximately midway between the inlet 68' and discharge portion 70'.

To accomplish the above, the second extruding mechanism 32' is constructed to define a reservoir 128 for the second rubber composition 20. The reservoir 128 surrounds the block 108 of the first rubber composition 16 and communicates to the flow passage 42' through a passageway 130, which extends fully around the axis 98' at the location 126. As seen most clearly in FIG. 4, the thickness of expansion portion 62" downstream of the location 126 has the aforementioned thickness T, corresponding to the desired end thickness for the sheet 28. Upstream of the location 126, the expansion portion 62" has a thickness T2, that is less than the thickness T by the dimension T3, which is the desired thickness for the second rubber composition 20. The additional thickness downstream of the location at 126 allows the second rubber composition 20 to be introduced without resistance as would potentially introduce internal stresses to the combined compositions 16,20. This also makes possible a consistent layering of the second rubber composition 20 fully around the first rubber composition 16 to a uniform thickness T3. The location at 126 can be anywhere between the inlet 68' and discharge port 70', and, in one preferred form, is at, or adjacent to, the discharge port 70'.

Figure 7:
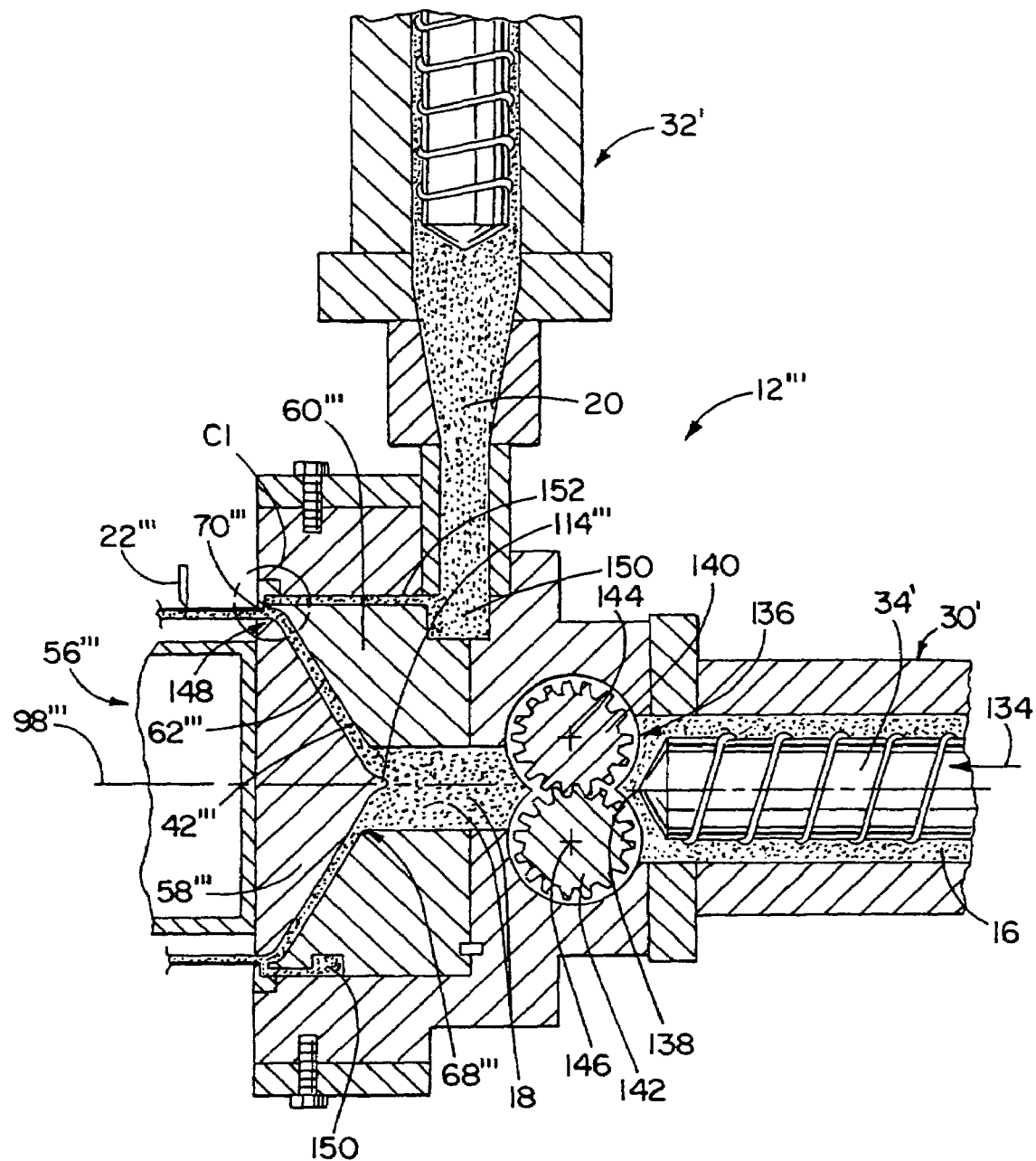
FIG. 7 is a view as in FIGS. 2 and 3 of a further modified form of mechanism for introducing rubber compositions into a cylindrically-shaped mold/die, according to the invention, and wherein one of the compositions is introduced at a different location than it is in either of the embodiments shown in FIGS. 2 and 3, and further including a gear pump to direct the first composition into the flow passage.
Figure 8:
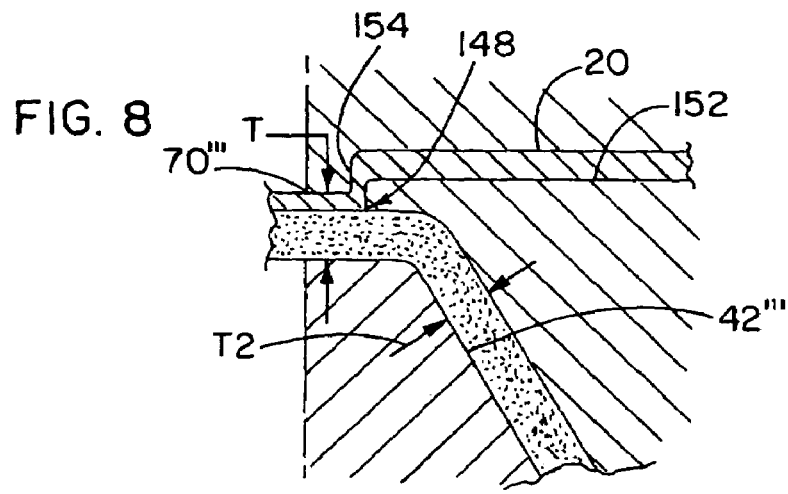
FIG. 8 is an enlarged, fragmentary, cross-sectional view of a location on the cylindrically-shaped mold/die in FIG. 8 wherein one of the compositions is introduced to the flow passage, and within the circle C1 in FIG. 7.

A further modified form of cylindrically-shaped mold/die, according to the present invention, is shown at 12''' in FIGS. 7 and 8. The cylindrically-shaped mold/die 12''' incorporates a first extruding mechanism 30', corresponding to that shown in FIG. 3. The cylindrically-shaped mold/die 12''' additionally includes a second extruding mechanism 32', corresponding to that shown also in FIG. 3. The extruding mechanisms 30',32' respectively knead and advance the first and second rubber compositions 16,20 into a flow passage 42''', including an expansion portion 62''' defined by an expansion portion 56''' of the cylindrically-shaped mold/die 12'''. The expansion portion 62''' has an inlet 68''' and a discharge portion 70''' between which the first rubber composition 16 flows to orient the short fibers 18 in the first rubber composition 16, as previously described.

The expansion portion 56''' of the cylindrically-shaped mold/die 12''' has an inner die element 58''' and an outer die element 60''' which cooperatively bound the expansion portion 62''' of the flow passage 42'''. The central axis 98''' of the expansion portion 56''' of the cylindrically-shaped mold/die 12''' is aligned with the direction of advancement of the first ruber composition 16 through the first extruding mechanism 30', as indicated by the arrow 134. The inner die element 58''' has a projection 114''' slightly upstream of the inlet 68'''. The projection 114''' diverts the, flow of the first rubber composition 16 radially outwardly into the expansion portion 62'''.

The cylindrically-shaped mold/die 12''' differs from the cylindrical-shaped mold/die 12" principally in two respects.

First, a gear pump at 136 is interposed between the discharge end 138 of the extrusion screw 34' and the projection 114'''. The gear pump 136 includes a drive gear 140 and a driven gear 142. The drive and driven gears 140,142 are in mesh with each other and rotate about parallel axes 144,146 so as to forcibly feed the kneaded first rubber composition 16 departing from the extrusion screw 34' towards the expansion portion 62''', in the direction of the arrow 134. The gear pump 136 potentially allows a large volume of the rubber composition to be delivered to the expansion portion 62''' without requiring a high pressure application to the compositions upstream that may generate unwanted heat.

The second difference resides in the location at 148 at which the second rubber composition 20 is introduced to the flow passage 42'''. The rubber composition 20, kneaded by the second extruding mechanism 32', is forced into a reservoir 150 and from there through a passageway 152 to the location 148 and into the stream of the moving first rubber composition 16. The passageway 152 extends continuously around the axis 98''' and terminates at a portion at 154 which directs the second rubber composition radially inwardly relative to the axis 98''' into the stream of the first rubber composition 16. The location 148 is adjacent to the discharge port 70''', spaced slightly downstream therefrom.

The flow passage 42''' has the aforementioned thickness T2 upstream of the location 148 and the greater thickness T downstream thereof to accommodate the additional thickness T3 attributable to the second rubber composition 20 that is combined at the location 148. This provides the advantages described above with respect to the corresponding structure in FIG. 4. It has been found that the dispersion of the second rubber composition 20 around the first rubber composition 16 is uniform and complete, using the location at 148 to introduce the second rubber composition 20.

It has also been discovered that in the other embodiments, described above, since the first rubber composition 16, containing short fibers 18 is hard, as compared to the second rubber composition 20, the flow of the second rubber composition 20 against the first rubber composition 16 can be affected adversely as the extrusion process is carried out. The desired laminar flow of the second composition 20 may not be achieved to the extent desired, as a result of which a certain amount of waviness may be generated on the resulting sheet 28. By situating the location at 148, at which the second composition is introduced, at or in the vicinity of the discharge port 70''', the flow distance over which the second rubber composition 16 flows, and is affected by, the first rubber composition 16, is minimized. This reduces the likelihood, or degree, of waviness.

While the cylindrically-shaped mold/die 12''' incorporates the different aspects, i.e., the above-described location where the second rubber composition 20 is introduced and the gear pump 136, the invention contemplates that either of these aspects could be incorporated into a system, independently of the other to achieve good manufacturing results.

Figure 9:
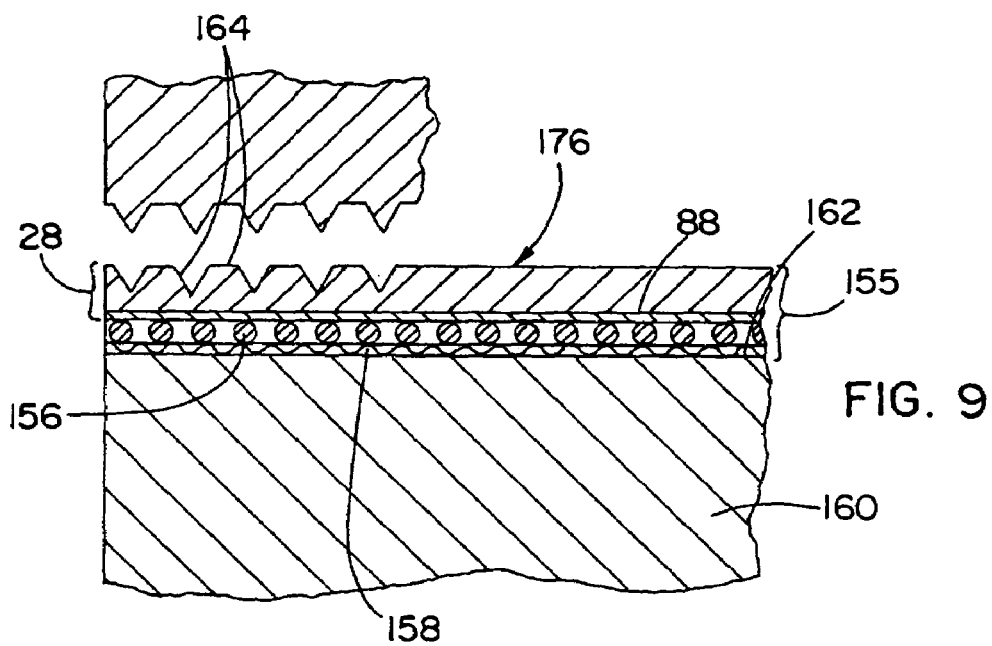
FIG. 9 is an enlarged, fragmentary, cross-sectional view of a belt sleeve preform, incorporating a sheet made according to the present invention, upon a molding drum and in relationship to a grinding element which forms ribs therein.

A method of making a power transmission belt, utilizing the sheet 28, made according to the present invention, will now be described with respect initially to FIG. 9. A composite sleeve preform 155, consisting of a sheet 28, a load carrying member 156, in the form of a spirally wrapped cord, and a cover canvas/cloth layer 158 are wrapped around a molding drum 160. The components are arranged on the molding drum 160 by serially applying the same against the outer molding drum surface 162. The cloth layer 158 is applied directly against the surface 162, after which the load carrying member 158 is spirally wrapped thereagainst. The sheet 28 is then applied with the second layer 88, defined by the second rubber composition 20, against the load carrying member 156. The components are formed into a cylindrical sleeve shape by machine joining using conventional techniques.

The canvas/cloth layer 158 may be made from a woven canvas, knit fabric, or the like, that is made from (a) synthetic fibers such polyester, nylon, aramid, vinylon, or the like, (b) a natural fiber, or (c) a blended yarn made from a combination of the synthetic and natural fibers. The cloth layer 158 is optionally provided on the sleeve preform 155. The disclosed sleeve preform 155 could be utilized to define a power transmission belt with ribs 164 on one side thereof, as is common to a V-belt or a V-ribbed belt construction.

Figure 10:
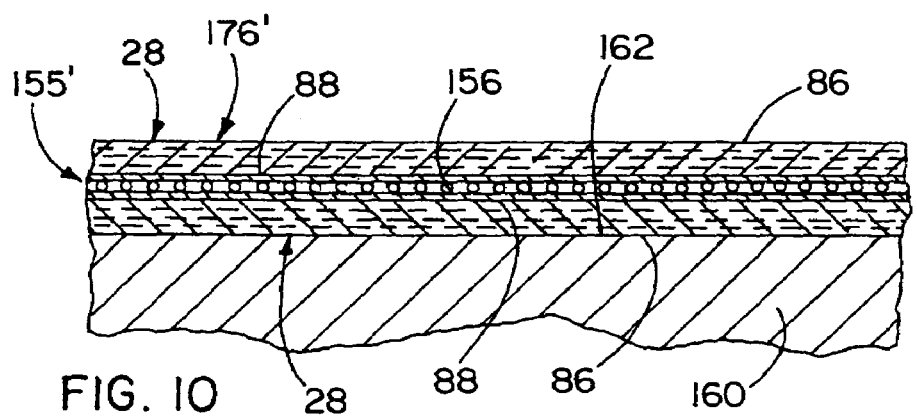
FIG. 10 is a fragmentary, cross-sectional view of a composite belt preform including two combined sheets, made according to the present invention, and in which oppositely projecting ribs can be formed.

As shown in FIG. 10, a modified form of composite sleeve preform is shown at 155', usable to make a power transmission belt with ribs formed on opposite sides thereof, such as in a double V-ribbed belt construction. The sleeve preform 155' consists of two separate sheets 28, made according to the present invention, and situated so that the second layers 88 face each other, with a load carrying member 156 spirally wrapped therebetween and directly against both of the second layers 88. The various components can be serially built up upon the molding drum 160. The innermost sheet 28 is applied to the outer surface 162 of the molding drum 160 by placing the first layer 86 of the innermost sheet 28 against the surface 162. This leaves the second layer 88 on the innermost sheet 28 exposed. The load carrying member 156 is then spirally wrapped, followed by the application of the outermost sheet 28 with the second layer 88 facing downwardly and placed against the spirally wrapped load carrying member 156.

Figure 11:
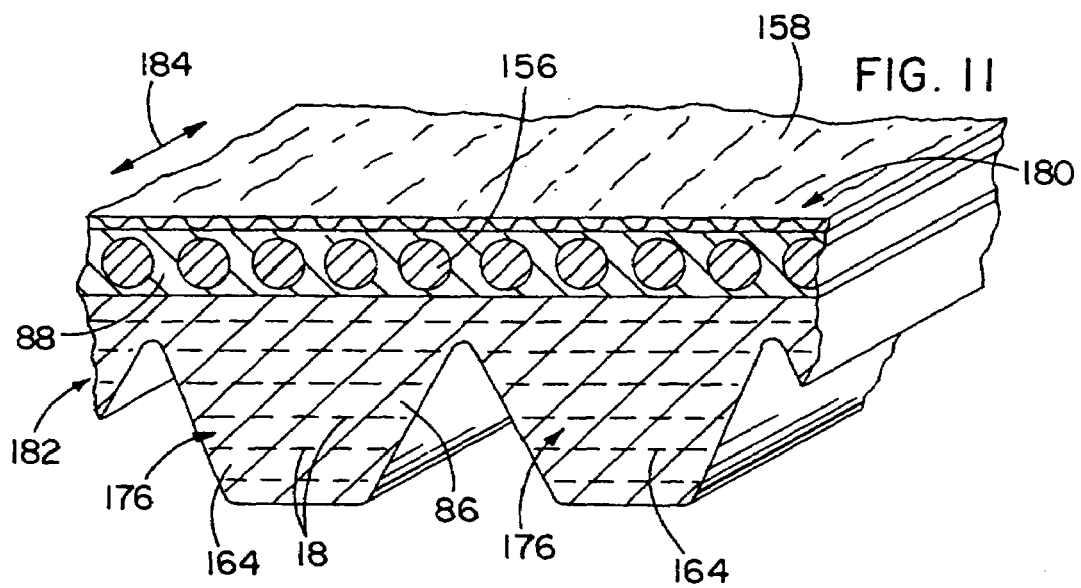
FIG. 11 is a fragmentary, cross-sectional, perspective view of a V-ribbed belt, made according to the present invention.
Figure 12:
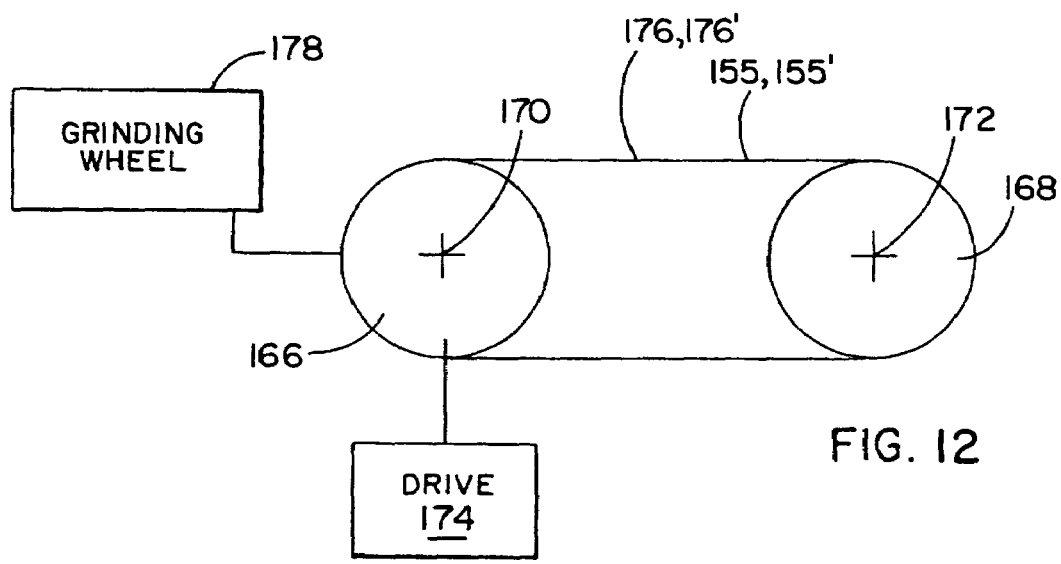
FIG. 12 is a schematic, side elevation view of a grinding system, including a belt sleeve trained around drive and driven pulleys and operated upon by a grinding wheel.

The resulting sleeve preforms 155,155' are cured in a conventional manner and trained around drive and driven rollers 166,168, as shown in FIG. 12. The rollers 166,168 are driven respectively around space, parallel axes 170,172. The drive roller 166 is operated by a drive 174. With this arrangement, the compression sections 176,176' on the sleeve preforms 155,155', shown in FIGS. 9 and 10, respectively, are exposed to be operated upon by a conventional grinding wheel 178. With the sleeve preforms 155,155' placed under a predetermined tension and moving in an endless path, the rotating grinding wheel 178 forms ribs 164 (FIG. 9) thereon. The resulting sleeve preform 155,155', with the ribs 164 formed thereon, can then be trained around another set of drive and driven rollers (not shown) and advanced while being cut to a predetermined width to produce individual belts, shown in FIG. 11 as an exemplary V-ribbed belt 180.

The sleeve preform 155' can be ground to produce a double-sided, V-ribbed construction by grinding the opposite layer 86 in a separate operation. One method for accomplishing this is shown in Japanese Patent No. 2,762,238, which is incorporated herein by reference.

The exemplary belt 180 has a body 182 with a length, as indicated in the direction of a double-headed arrow 184. The load carrying member 156 is embedded in the layer 88, which functions as a cushion rubber layer. The ribs 164 are laterally spaced and each have a truncated, generally triangular-shaped cross section. The ribs 164 are defined in the layer 86, which is part of the compression section 176 of the belt 180. The canvas/cloth layer 158 is laminated to the cushion rubber layer 88. The short fibers 18 are embedded in the layer 86, with their lengths oriented laterally with respect to the belt body 182.

Figure 13:
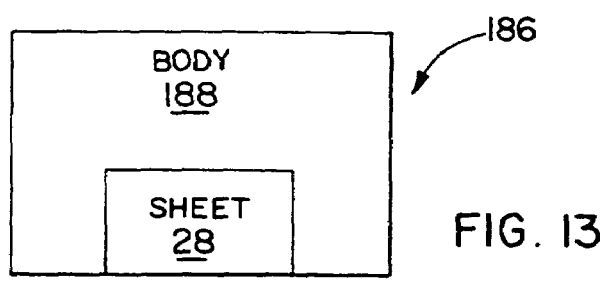
FIG. 13 is a generic representation of a power transmission belt, made according to the invention.

As shown in FIG. 13, it should be understood that the inventive method of manufacturing the sheet 28 can be used to make virtually any type of power transmission belt, as shown generically at 186 in FIG. 13 with a body 188 defined at least in part by the sheet 28.

In all belt configurations, the short fibers 18 may be made from one, or combination of, nylon 6, nylon 66, polyester, cotton, or aramid. The fibers 18 enhance the lateral pressure resistance of the ribs 164 and may reduce operating noise caused by impacting of the belt against cooperating pulleys.

If aramid short fibers 18 are utilized, it is preferred that they have a length of from 1 to 20 mm and that they be present in an amount of 1 to 30 parts by mass relative to 100 parts by mass of the rubber in which they are incorporated. If the short fibers 18 are aramid fibers, preferably they have an aromatic ring in the molecular structure. Fibers suitable for this purpose are sold commercially under the names CONEX™, NOMEX™, KEVLAR™, TECHNORA™, TWARON™, and the like.

If aramid fibers 18 are present in an amount less than one part by mass, the ribs 164 may not have an adequate lateral pressure resistance. If the aramid fibers 18 are present in an amount over 30 parts by mass, the fibers may not become evenly disbursed in the rubber during manufacturing. The use of aramid fibers is not required, as other materials may be utilized in place of, or in conjunction with, the aramid fibers.

The rubber used in the layer 88, to define the compression sections 176,176', may be one or a combination of hydro-nitryl rubber, chloroprene rubber, natural rubber, CSM, ACSM, SBR, and ethylene-α-olefin elastomer. If hydro-nitryl rubber is used, it preferably has a hydrogen addition rate of not less than 80%, and preferably not less than 90%, to provide good heat and ozone resistance. Hydro-nitryl rubber with a hydrogen addition rate of not greater than 80% may have inadequate heat and ozone resistance. For purposes of providing good oil and low temperature resistance, acrylonitrile is combined, preferably in an amount to 20–45%. Among these compositions, ethylene-α-olefin elastomer, having good oil and low temperature resistance, is preferred.

A suitable ethylene-α-olefin elastomer is ethylene-propylene-diene monomer (EPDM). Examples of diene monomers are dicyclopentadiene, methylene norbornene, ethylidene norbornene, 1,4-hexadiene, cyclooctadiene, etc. Ethylene-propylene base rubber (EPR) is also usable.

Sulfur and organic peroxide may be used to cross-link the above-mentioned rubbers. Suitable organic peroxides are one, or a combination, of dicumyl peroxide, di-t-butyl peroxide, t-butylcumyl peroxide, benzoyl peroxide, 1,3-bis (t-butyl peroxy isopropyl)benzene, 2,5-dimethyl-2,5-di(t-butyl peroxy)hexyne-3,2,5-dimethyl-2,5-(benzoyl peroxy) hexane, 2,5-dimethyl-2,5-mono(t-butyl peroxy)hexane, etc.

By blending a co-agent, the degree of cross-linking can be increased to avoid adhesive abrasion, and the like. Among the suitable co-agents that will effectively accomplish this are TIAC, TAC, 1,2 polybutadiene, metal salt of unsaturated carboxylic acid, oxime group, guanidine, trimethylolpropane trimethacrylate, ethylene glycol diemethacrylate, N-N'-m-phenylene bismaleimide, sulfer, and the like, which are normally used for peroxide cross-linkage.

A reinforcing material, such as carbon black and silica, may be used as desired and needed. A bulking agent, such as calcium carbonate and talc, a plasticizer, a stabilizing agent, a processing aid, and/or a coloring agent, normally used for rubber compounds, may also be used.

The rubber composition used for the cushion/first layer 88 may be similar to, or the same as, the rubber composition used in the second layer 88/compression section 176,176'. The rubbers could also be different. While fibers are not disclosed in the second layer 88, fibers could be utilized in this layer as well.

The load carrying members 156 may be made from one, or a combination of, polyester fiber, aramid fiber and glass fiber. In one form, each load carrying member 156 is a cord define by twisting groups of polyester fiber filaments with a main unit consisting of ethylene-2 and 6-naphthalate, to a total denier of 4000 to 8000. The cord may be subjected to adhesion processing to control belt slip rate and thereby extend the belt life. The load carrying members 156 may be adhesion treated also to improve their adhesion to the base rubber. It is common to adhesion treat the load carrying member 156 by immersing the fibers in a resorcin-formalin-latex (RFL) liquid, after which they are heated and dried to form an adhesive layer that is uniformly dispersed on the outer surface of the load carrying members 156. Other adhesive treatments are contemplated. As one alternative, the RFL liquid may be utilized after preliminarily processing the same with an epoxy or isocyanate compound.

By using a spinning/winding pitch for the load carrying members 156 of 0.9 to 1.3 mm, a belt incorporating the same may exhibit a high modulus. With a pitch of less than 0.9 mm, adjacent turns of the load carrying member 156 may interfere with each other. With a pitch greater than 1.3 mm, the modulus for a belt incorporating the load carrying member 156 may be reduced to an unacceptable extent.

The cloth layer 158 may be made from a material that is a cloth, knitted, or a nonwoven fabric. Of these, nonwoven fabric is preferred. The fiber material defining the fabric may be at least one of a) natural fiber such as cotton, linen, rayon, and the like, or b) organic fiber such as polyamide, polyester, polyethylene, polyurethane, polystyrene, polyfluoroethylene, polyacryl, polyvinyl alcohol, aromatic polyester, aramid, and the like. The canvas/cloth layer 158 is immersed in an RFL liquid using known techniques and subjected to a friction treatment, through which non-cured rubber is rubbed on the exposed surface of the canvas/cloth layer 158. The layer is then immersed in RFL liquid and may be processed by immersion in a soaking liquid having rubber dissolved in a solvent.

The invention makes possible the formation of a relatively thick sheet 28 in a shorter time frame and with less labor than normally associated with the process of sheet manufacture wherein a plurality of thin layers are laminated. The sheet 28 may be made with high integrity by reason of the integral formation of the layers 86,88 in the manner described above. The advantages of the inventive method are demonstrated below, for a V-ribbed belt construction, through actual testing.

COMPARATIVE EXAMPLE

A CR rubber compound, as shown in Table 1, was formed with short fibers embedded.

TABLE 1

|  | SHORT-FIBER CONTAINING RUBBER PARTS BY MASS | CUSHION LAYER RUBBER PARTS BY MASS |
|---|---|---|
| CR (SULPHUR MODIFIED TYPE) | 100 | 100 |

TABLE 1-continued

|  | SHORT-FIBER CONTAINING RUBBER PARTS BY MASS | CUSHION LAYER RUBBER PARTS BY MASS |
|---|---|---|
| STEARIC ACID | 2 | 2 |
| NYLON CUT YARN | 15 | — |
| ARAMID CUT YARN | 5 | — |
| OIL | 5 | 5 |
| CARBON BLACK | 25 | 25 |
| ANTIOXIDANT | 4 | 4 |
| BISMALEIMIDE | 2 | 2 |
| ZINC OXIDE | 5 | 5 |

The fibers were placed in the rubber on an open roll to perform kneading thereon. A master batch was kneaded and cooled to room temperature. The master batch and additional compounds, as shown in Table 1, were placed in an extruder. Simultaneously, the CR rubber compound of Table 1 was placed into an extruder, as shown in FIG. 1, to knead the rubber containing short fibers preparatory to extrusion. No cushion layer rubber was used in this Example, and only one layer of rubber containing short fibers was used.

The rubber containing the short fibers was extruded and gradually extended in moving towards the discharge port. In the process, shearing forces were imparted to the rubber composition using a conventional expansion die and under conditions as set out in Table 2, below.

A two-layered cylindrically-shaped mold product, consisting of a) rubber with short fibers embedded therein on an inner peripheral side and b) a cushion rubber layer laminated on an outer peripheral side, were extrusion molded and cut to define a sheet.

Two plies of rubberized cotton canvas were laminated on a molding drum. Load carrying members, made of polyester fiber rope, were then applied to the cotton canvas, followed by the molded belt body sheet containing the cushion layer rubber.

The orientation of the short fibers in the resulting sheet were evaluated. To carry out this evaluation, the sheet was sliced into three layers, including an outer layer, a middle layer, and an inner layer. Tensile strength ratio [TB ratio—(direction perpendicular to extrusion/direction in parallel to extrusion] and elongation (EB) in a direction parallel to the extrusion direction, at the time of tensile breakage, were determined by measuring tensile strength (TB) of the sheets in a circumferential direction and in an axial direction, respectively, according to JIS K6251. The greater the tensile strength in the direction perpendicular to extrusion, as compared with the tensile strength in the direction in parallel to extrusion, i.e., the greater the TB ratio, the more favorable the orientation of short fibers is in the circumferential direction.

It was found that the magnitude of the TB ratio in the outer layer corresponded to the cushion layer rubber and differences in TB ratio and EB were slight in the middle and inner layers, so that the short fibers were favorably oriented.

TABLE 2

|  |  |  | INVENTIVE EXAMPLE (TWO LAYERS) | COMPARATIVE EXAMPLE (SINGLE LAYER) |
|---|---|---|---|---|
| EXTRUDER |  |  | φ90*1/φ60*2 | φ90 |
| EXPANSION HEAD | NIPPLE DIAMETER (mm) |  | φ260 | φ260 |
|  | RUBBER PASSAGE OUTLET CENTRAL DIAMETER (mm) R2 |  | φ262.5 | φ262 |
|  | RUBBER PASSAGE INLET CENTRAL DIAMETER (mm) R1 |  | φ77 | φ77 |
|  | EXPANSION RATIO R2/R1 |  | 3.4 | 3.4 |
| TEMPERATURE (° C.) | SCREW |  | 60 | 60 |
|  | CYLINDER (THROWING SIDE) |  | 60 | 60 |
|  | CYLINDER (HEAD SIDE) |  | 50 | 50 |
|  | HEAD |  | 75 | 75 |
| SCREW ROTATING SPEED (rpm) |  |  | 20 | 20 |
| RUBBER SHEET THICKNESS (mm) | SHORT-FIBER CONTAINING RUBBER |  | 3.0 | 3.0 |
|  | ADHESIVE RUBBER |  | 0.5 | — |
| RUBBER SHEET WIDTH (mm) |  |  | 640 | 640 |
| ORIENTATION | TB RATIO | OUTER LAYER | (CUSHION LAYER RUBBER) | 1.5 |
|  |  | MIDDLE LAYER | 2.0 | 2.0 |
|  |  | INNER LAYER | 2.0 | 1.5 |
|  | EB(%) | OUTER LAYER | (CUSHION LAYER RUBBER) | 50 |
|  |  | MIDDLE LAYER | 300 | 300 |
|  |  | INNER LAYER | 250 | 100 |
|  |  | MIDDLE LAYER | 300 | 300 |
|  |  | INNER LAYER | 250 | 100 |

*1screw diameter of extruder for short fiber-containing rubber
*2screw diameter of extruder for cushion layer rubber
TB: tensile breaking strength
TB ratio = TB (direction perpendicular to extrusion)/TB (direction in parallel to extrusion)
EB = elongation in a direction parallel to extrusion direction at the time of tensile breakage Since the outer layer defined a cushion layer rubber, the orientation of the fibers can be neglected. With the single layer in the Comparative Example, it was found that the outer layer had a small TB ratio and EB and thus the orientation of the short fibers was not uniform.

Curing was performed in a conventional manner after fitting a vulcanization jacket onto the belt sleeve preform. After curing, the jacket was removed and the belt sleeve was removed from a molding drum upon which it was mounted. The belt sleeve was ground to produce ribs, with individual belts cut from the belt sleeve to form individual V-ribbed belts.

The V-ribbed belts that resulted were a K type 3-ribbed belt, according RMA standards, with a length of 975 mm, a rib pitch of 3.56 mm, a rib height of 2.0 mm, a belt thickness of 4.30 mm, and a rib angle of 40°.

INVENTIVE EXAMPLE

AN EPDM compound shown in Table 3, below, was used for rubber containing short fibers.

TABLE 3

|  | SHORT-FIBER CONTAINING RUBBER PARTS BY MASS | CUSHION LAYER RUBBER PARTS BY MASS |
|---|---|---|
| EPDM | 100 | 100 |
| NYLON CUT YARN | 15 | — |
| ARAMID CUT YARN | 5 | — |
| STEARIC ACID | 1 | 1 |
| ZINC OXIDE | 5 | 5 |
| CARBON BLACK | 50 | 50 |
| OIL | 10 | 10 |
| ANTIOXIDANT | 2 | 2 |
| N, N-m-PHENYLENE DIAMALEIMIDE | 2 | 2 |
| PEROXIDE | 8 | 8 |

The fibers were placed in rubber in an open roll to produce a master batch. The master batch was kneaded and ejected and cooled to room temperature. The master batch and other components were placed in an extruder, as shown in FIG. 7. Simultaneously, the EPDM rubber compound shown in Table 3, usable for the cushion layer rubber, was placed in an extruder, as shown in FIG. 7, to knead and cause rubber containing short fibers to be extruded.

The rubber compositions were extruded towards a discharge port and extended in a circumferential direction, with shearing forces imparted to the rubber using a system and operating conditions as shown in Table 4, below.

TABLE 4

| | | | INVENTIVE EXAMPLE (TWO LAYERS) | | COMPARATIVE EXAMPLE (SINGLE LAYER) |
|---|---|---|---|---|---|
| EXTRUDER | | | φ90*1 | φ60*2 | φ90 |
| EXPANSION HEAD | NIPPLE DIAMETER (mm) | | φ260 | | φ260 |
| | RUBBER PASSAGE OUTLET CENTRAL DIAMETER (mm) R2 | | φ263.4 | | φ262.9 |
| | RUBBER PASSAGE INLET CENTRAL DIAMETER (mm) R1 | | φ77 | | φ77 |
| | EXPANSION RATIO R2/R1 | | 3.4 | | 3.4 |
| TEMPERATURE (° C.) | SCREW | | 95 | 50 | 95 |
| | CYLINDER (THROWING SIDE) | | 90 | 60 | 90 |
| | CYLINDER (HEAD SIDE) | | 95 | 60 | 95 |
| | HEAD | | 95 | 85 | 95 |
| SCREW ROTATING SPEED (rpm) | | | 25 | 50 | 25 |
| RUBBER SHEET THICKNESS (mm) | SHORT-FIBER CONTAINING RUBBER | | 3.0 | | 3.0 |
| | CUSHION LAYER RUBBER | | 0.5 | | — |
| RUBBER SHEET WIDTH (mm) | | | 640 | | 640 |
| ORIENTATION | TB RATIO | OUTER LAYER | (CUSHION LAYER RUBBER) | | 1.8 |
| | | MIDDLE LAYER | 1.9 | | 1.9 |
| | | INNER LAYER | 1.7 | | 1.7 |
| | EB(%) | OUTER LAYER | (ADHESIVE RUBBER) | | 200 |
| | | MIDDLE LAYER | 220 | | 220 |
| | | INNER LAYER | 210 | | 200 |

*1 screw diameter of extruder for short fiber-containing rubber
*2 screw diameter of extruder for cushion layer rubber
TB: tensile breaking strength
TB ratio = TB (direction perpendicular to extrusion)/TB (direction in parallel to extrusion)
EB = elongation in a direction parallel to extrusion at the time of tensile breakage A two-layered cylindrically-shaped mold product resulted consisting of a) the rubber containing the short fibers laminated on an inner peripheral side thereof and b) cushion layer rubber laminated on an outer peripheral side thereof. The resulting extrusion molded structure was cut to produce a molded sheet, including the cushion rubber layer.

Two plies of rubberized cotton canvas were laminated on a molding drum. Load carrying members, consisting of a polyester fiber rope, were wrapped thereagainst. The molded sheet was then applied to produce a sleeve preform. A vulcanization jacket was fit onto the sleeve preform after which curing was carried out in a conventional manner. After curing, the jacket was removed and the belt sleeve separated from the molding drum. The sleeve was then ground to form V-shaped grooves, after which individual belts of a desired width were cut from the sleeve. The resulting V-ribbed belts had the same dimensions as those described for the Comparative Example.

The orientation of the short fibers in the resulting molded sheet with the cushion layer rubber incorporated was evaluated in the same manner as for the Comparative Example. The tensile strength ratio (TB) and the elongation (EB) in a direction parallel to extrusion at the time of tensile breakage were determined.

It was determined that the middle and inner layers of the molded sheet with cushion layer rubber showed only slight differences in TB ratio and EB, evidencing that the fibers were favorably oriented.

While the invention has been described with particular reference to the drawings, it should be understood that various modifications could be made without departing from the spirit and scope of the present invention.

The invention claimed is:

1. A method of manufacturing a power transmission belt comprising a body with a length and a cushion rubber layer in which at least one load carrying member is embedded so as to extend lengthwise of the body, said method comprising the steps of:
providing a mold having a flow passage with a discharge port;
extrusion molding (a) a first rubber composition comprising rubber with short fibers therein and (b) a second rubber composition that is different than the first rubber composition to produce a first sheet in which the second rubber composition defines at least a part of the cushion rubber layer,
the step of extrusion molding the first and second compositions comprising the steps of causing the first rubber composition to flow downstream through the flow passage and to and from the discharge port and causing the second rubber composition to be directed against the first rubber composition and to flow with the first rubber composition through the flow passage to and through the discharge port,
the step of extrusion molding the first and second rubber composition further comprising causing the first rubber composition to flow through a portion of the flow passage without the second rubber composition directed against the first rubber composition;
applying the at least one load carrying member to the second rubber composition to produce a preform assembly; and
processing the preform assembly to produce a power transmission belt.

2. The method of manufacturing a power transmission belt according to claim 1 wherein the step of extrusion molding a first rubber composition and a second rubber composition comprises extrusion molding a second rubber composition that has no short fibers therein.

3. The method of manufacturing a power transmission belt according to claim 2 wherein the step of providing a mold comprises providing a cylindrically-shaped mold with an inside peripheral surface and an outside peripheral surface between which a flow passage having a diameter is defined with an expansion portion with an inlet and a discharge port and in which the flow passage increases in diameter from the inlet towards the discharge port and the step of extrusion molding a first rubber composition and a second rubber composition comprises extrusion molding a first rubber composition and a second rubber composition so that the first rubber composition is at and moves against the inside peripheral surface and the second rubber composition is at and moves against the outside peripheral surface as the first and second rubber compositions move together to the discharge port.

4. The method of manufacturing a power transmission belt according to claim 3 wherein the step of applying the at least one load carrying member comprises wrapping the at least one load carrying member and the first sheet around a molding drum and against each other.

5. The method of manufacturing a power transmission belt according to claim 3 further comprising the step of kneading the first rubber composition before the first rubber composition is introduced to the inlet of the expansion portion of the flow passage.

6. The method of manufacturing a power transmission belt according to claim 5 wherein the step of kneading the first rubber composition comprises kneading the first rubber composition using an extrusion screw.

7. The method of manufacturing a power transmission belt according to claim 6 further comprising the step of passing the first rubber composition through a gear pump.

8. The method of manufacturing a power transmission belt according to claim 7 wherein the step of passing the first rubber composition through a gear pump comprises passing the first rubber composition through a gear pump between the extrusion screw and the inlet of the expansion portion of the flow passage.

9. The method of manufacturing a power transmission belt according to claim 1 wherein the step of processing the preform assembly comprises grinding the body to define ribs extending lengthwise of the body.

10. The method of manufacturing a power transmission belt according to claim 9 wherein the step of grinding the body comprises grinding the first rubber composition.

11. The method of manufacturing a power transmission belt according to claim 1 wherein the step of processing the preform assembly comprises applying at least one additional layer to the preform assembly.

12. The method of manufacturing a power transmission belt according to claim 11 wherein the step of applying at least one additional layer comprises applying a fabric layer to the preform assembly.

13. The method of manufacturing a power transmission belt according to claim 11 wherein the step of applying at least one additional layer comprises applying a rubber layer to the preform assembly.

14. The method of manufacturing a power transmission belt according to claim 1 further comprising the steps of manufacturing a second sheet in substantially the same manner as the first sheet is manufactured and joining the first and second sheets to each other to produce a composite preform assembly.

15. The method of manufacturing a power transmission belt according to claim 14 wherein the step of processing the preform assembly comprises processing the composite preform assembly by forming ribs in the body.

16. The method of manufacturing a power transmission belt according to claim 15 wherein the step of forming ribs in the body comprises forming ribs in each of the first and second sheets.

17. The method of manufacturing a power transmission belt according to claim 1 wherein the step of applying the at least one load carrying member comprises applying the at least one load carrying member directly to the second rubber composition.

18. The method of manufacturing a power transmission belt according to claim 1 wherein the step of extrusion molding a first rubber composition and a second rubber composition comprises extruding the first rubber composition into a cylindrical shape with a peripheral inner surface and a peripheral outer surface and thereafter extruding the second rubber composition to cover the peripheral outer surface of the cylindrical shape defined by the first rubber composition within the flow passage to produce a composite cylindrical shape that flows from the discharge port.

19. The method of manufacturing a power transmission belt according to claim 18 wherein the mold is cylindrically shaped the step of extrusion molding a first rubber composition and a second rubber composition comprises causing the composite cylindrical shape to be extruded through the flow passage in an expansion portion of the flow passage having an inlet upstream of the discharge port and wherein the flow passage is defined between an inside peripheral surface and an outside peripheral surface on the cylindrically-shaped mold and configured so that the diameter of the flow passage increases from the inlet towards the discharge port.

20. The method of manufacturing a power transmission belt according to claim 19 wherein the step of extrusion molding a first rubber composition and a second rubber composition comprises simultaneously and continuously introducing the first and second rubber compositions into the flow passage.

21. The method of manufacturing a power transmission belt according to claim 20 wherein the step of extrusion molding a first rubber composition and a second rubber composition comprises introducing the first rubber composition into the flow passage at a first location and introducing the second rubber composition into the flow passage downstream from the first location at a second location.

22. The method of manufacturing a power transmission belt according to claim 21 wherein the flow passage has a radial thickness and the step of extrusion molding a first rubber composition and a second rubber composition comprises causing the first rubber composition to have a controlled first thickness between the first location and the second location and causing the thickness of the combined first composition and second composition in the flow passage to have a controlled second thickness that is greater than the first thickness between the second location and the discharge port.

23. The method of manufacturing a power transmission belt according to claim 21 wherein the step of introducing the first rubber composition comprises introducing the first rubber composition at the first location at the inlet to the expansion portion of the flow passage.

24. The method of manufacturing a power transmission belt according to claim 21 wherein the step of introducing the second rubber composition comprises introducing the second rubber composition at the second location downstream of the inlet for the expansion portion of the flow passage.

25. The method of manufacturing a power transmission belt according to claim 24 wherein the step of introducing the second rubber composition comprises introducing the second rubber composition at the second location adjacent to the discharge port.

26. The method of manufacturing a power transmission belt according to claim 1 wherein the step of processing the preform assembly comprises processing the preform assembly to produce one of a V-belt, a V-ribbed belt, and a double V-ribbed belt.

27. A method of manufacturing a rubber sheet to define at least a part of a compression rubber layer and cushion rubber layer in a power transmission belt, said method comprising the steps of:
    extrusion molding (a) a first rubber composition comprising rubber with short fibers therein and (b) a second rubber composition that is different than the first rubber composition to produce a sheet;
    said step of extrusion molding comprising (c) extrusion molding the first and second rubber compositions in a cylindrically-shaped mold with an inside peripheral surface and an outside peripheral surface between which a flow passage having a diameter is defined with an expansion portion with an inlet and a discharge port and in which the flow passage increases in diameter from the inlet towards the outlet so that the first and second rubber compositions flow through the flow passage and are combined in such a manner that the first rubber composition is primarily against the second rubber composition and at the inside peripheral surface and not against the outside peripheral surface and the second rubber composition is primarily against the first rubber composition and at the outside peripheral surface and not against the inside peripheral surface, and (d) cutting the combined extruded first and second rubber compositions discharged at the discharge port to configure the first and second combined rubber composition discharged at the discharge port into a sheet form.

28. The method of manufacturing a rubber sheet for a power transmission belt according to claim 27 wherein the step of extrusion molding a first rubber composition and a second rubber composition comprises extrusion molding a second rubber composition that has no short fibers therein.

29. The method of manufacturing a rubber sheet for a power transmission belt according to claim 27 wherein the step of extrusion molding a first rubber composition and a second rubber composition comprises extruding the first rubber composition into a cylindrical shape with a peripheral inner surface and a peripheral outer surface and thereafter extruding the second rubber composition to cover the peripheral outer surface of the cylindrical shape defined by the first rubber composition to produce a composite cylindrical shape.

30. The method of manufacturing a rubber sheet for a power transmission belt according to claim 29 wherein the step of extrusion molding a first rubber composition and a second rubber composition comprises simultaneously and continuously extruding the first and second rubber compositions through the flow passage.

31. The method of manufacturing a rubber sheet for a power transmission belt according to claim 30 wherein the step of extrusion molding a first rubber composition and a second rubber composition comprises introducing the first rubber composition into the flow passage at a first location and introducing the second rubber composition into the flow passage downstream from the first location at a second location.

32. The method of manufacturing a rubber sheet for a power transmission belt according to claim 31 wherein the flow passage has a radial thickness and the step of extrusion molding a first rubber composition and a second rubber composition comprises causing the first rubber composition to have a controlled first thickness between the first location and the second location and causing the thickness of the combined first composition and second composition in the flow passage to have a controlled second thickness that is greater than the first thickness between the second location and the discharge port.

33. The method of manufacturing a rubber sheet for a power transmission belt according to claim 31 wherein the step of introducing the first rubber composition comprises introducing the first rubber composition at the first location at the inlet to the expansion portion of the flow passage.

34. The method of manufacturing a rubber sheet for a power transmission belt according to claim 31 wherein the step of introducing the second rubber composition comprises introducing the second rubber composition at the second location downstream of the inlet for the expansion portion of the flow passage.

35. The method of manufacturing a rubber sheet for a power transmission belt according to claim 34 wherein the step of introducing the second rubber composition comprises introducing the second rubber composition at the second location adjacent to the discharge port.

36. The method of manufacturing a rubber sheet for a power transmission belt according to claim 27 further comprising the step of kneading the first rubber composition before the first rubber composition is introduced to the inlet of the expansion portion of the flow passage.

37. The method of manufacturing a rubber sheet for a power transmission belt according to claim 36 wherein the step of kneading the first rubber composition comprises kneading the first rubber composition using an extrusion screw.

38. The method of manufacturing a rubber sheet for a power transmission belt according to claim 37 further comprising the step of passing the first rubber composition through a gear pump.

39. The method of manufacturing a rubber sheet for a power transmission belt according to claim 38 wherein the step of passing the first rubber composition through a gear pump comprises passing the first rubber composition through a gear pump between the extrusion screw and the inlet of the expansion portion of the flow passage.

* * * * *